United States Patent
Schön

(10) Patent No.: US 6,391,159 B2
(45) Date of Patent: *May 21, 2002

(54) DIMENSIONALLY STABLE, LIQUID IMPERMEABLE, FLEXIBLE PRESSBANDS

(75) Inventor: Werner Schön, Heidenheim (DE)

(73) Assignee: Scapa Forming GmbH, Heidenheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,947

(22) Filed: Dec. 9, 1998

(30) Foreign Application Priority Data

Dec. 9, 1997 (DE) .......................... 197 54 631

(51) Int. Cl.⁷ ........................ D21F 3/00; B32B 27/04; B29D 22/00
(52) U.S. Cl. ................ 162/358.4; 162/348; 162/358.1; 162/358.2; 162/358.3; 162/900; 162/901; 162/902; 162/903; 162/904; 442/50; 442/58; 428/36.1; 428/36.3; 428/297.7
(58) Field of Search ............................... 428/36.1, 36.3, 428/36.4, 297.7; 442/50–58; 162/205, 206, 306, 348, 358.1, 358.2, 358.3, 358.4, 900–904; 28/110, 112; 34/123, 111

(56) References Cited

U.S. PATENT DOCUMENTS

| | | | |
|---|---|---|---|
| 4,552,620 A | | 11/1985 | Adams |
| 4,923,570 A | | 5/1990 | Steiner et al. |
| 5,118,391 A | * | 6/1992 | Matsuschczyk et al. .... 162/358 |
| 5,132,141 A | * | 7/1992 | Schon ........................ 427/171 |

(List continued on next page.)

FOREIGN PATENT DOCUMENTS

| | | |
|---|---|---|
| DE | 40 22 800 C1 | 9/1991 |
| EP | 0 354 743 A1 | 2/1990 |

(List continued on next page.)

Primary Examiner—Terrel Morris
Assistant Examiner—Ula C. Ruddock
(74) Attorney, Agent, or Firm—Ware, Fressola, Van Der Sluys & Adolphson

(57) ABSTRACT

The invention relates to a method of and a device for the manufacture of dimensionally stable, liquid-impermeable, flexible, elastic pressbands, particularly for use with broadnip shoepresses of paper making machines. The method comprising pouring a flowable mixture of a prepolymer onto a substrate moved by a distance maintaining device over a cylindrical mandrel and maintained during this movement in an adjustable distance from the surface of said mandrel, and being coated during this movement by a coating device with a flowable prepolymer, wherein during this coating of the substrate threads or wires are laid down onto the substrate in the direction of rotation of the mandrel and are coated with the polymer substance. In order to provide a method of the initially specified kind in such a way that the manufactured pressbands have the required high strength and tensile stability and that they are able to maintain both over long times of operation, the invention proposes that a net, texture, knitted fabric or a similar structure is used as substrate tensioned over the surface of the mandrel and consisting of non-woven threads located transverse to the longitudinal direction of the pressband and forming meshs the width thereof is chosen dependent especially on the viscosity of the prepolymer mass such that the meshs are completely impregnated by the prepolymer mass poured onto the meshs and that the threads of the net, texture, knitted fabric or similar structure are completely coated by the meshs forming on the side opposite to the surface of the mandrel a closed, smooth surface of prepolymer material, the thickness of which corresponds to the distance of the substrate from the surface of the mandrel, which polymer material can be separated from that mandrel surface.

10 Claims, 3 Drawing Sheets

U.S. PATENT DOCUMENTS

| | | |
|---|---|---|
| 5,196,092 A | 3/1993 | Stigberg |
| 5,525,194 A | 6/1996 | Olli |
| 5,626,723 A * | 5/1997 | Schiel et al. ............. 162/358.4 |
| 5,772,848 A | 6/1998 | Dutt |
| 6,171,447 B1 * | 1/2001 | Trokhan .................. 162/358.2 |

FOREIGN PATENT DOCUMENTS

| | | |
|---|---|---|
| EP | 0 859 082 A3 | 8/1998 |
| EP | 0 859 082 A2 | 8/1998 |
| WO | WO 88/08897 | 11/1988 |

* cited by examiner

DIMENSIONALLY STABLE, LIQUID IMPERMEABLE, FLEXIBLE PRESSBANDS

BACKGROUND OF THE INVENTION

The invention relates to a method of and device for the manufacture of dimensionally stable, liquid-impermeable, flexible, elastic pressbands, particularly for use with broad-nip shoepresses of paper making machines, said method comprising pouring a flowable mixture of a prepolymer onto a substrate moved by a distance maintaining device over a cylindrical mandrel and maintained during this movement in an adjustable distance from the surface of said mandrel, and being coated during this movement by a coating device with a flowable prepolymer, wherein during this coating of the substrate threads or wires are laid down onto the substrate in the direction of rotation of the mandrel and are coated with the polymer substance.

Such method is known from the German published patent application DE 40 22 800. The pressbands and presscoats for wet presses manufactured by this known method, are disadvantageous, however, because of the fact that the longitudinal threads and cross threads embedded in the coating material are slowly released from the coating material under the pressure forces and tensional forces created within the press band during operation of such a wet press, if the tensile modules of threads, adhesion promoters and coating material had not been precisely checked up to one another previously. Such a check up, however, is rather difficult. Moreover, the tensile modules are changing because of ageing. As a consequence thereof the so-called excavating or tunneling effect arises according to which the threads are providing around them hollow spaces because of the alternating tensions affecting them. This effect, however, essentially decreases the strength of the band substantially and thus also its lifetime or durability and destroys in this connection especially the original tensile strength of the band.

Moreover, pressbands manufactured according to the known method are often destroyed during operation in case the paper web is drawn into the nip together with waste material causing a local breaking of the pressband below the shoe, whereas the elastic felt web proceeds on the non-breaked areas of the pressband. That is the reason why the pressband is generally so strongly deformed in the range of failure that it breaks in cross-direction as soon as the deformation forces cannot be taken over by the pressband.

SUMMARY OF THE PRESENT INVENTION

It is therefore an object underlying the invention to provide a method of the initially specified kind in such a way that the manufactured pressbands have the required high strength and tensile stability and that they are able to maintain both over very long times of operation.

It is a further object of the invention to improve the method of manufacturing insofar as the pressbands remain rather unaffected in case of local deformations of such pressbands caused by waste material in the nip of the shoepress.

It is still a further object of the invention to provide a device which is designed in such a way as to permit a highly economic and therefore inexpensive performing of said method and in this connection also an improved pressband should be manufactured.

These and other objects are accomplished according to one aspect of the invention by providing a net, texture, knitted fabric or a similar structure as substrate tensioned over the surface of the mandrel and consisting of non-woven threads located transverse to the longitudinal direction of the pressband and forming meshs the width thereof is chosen dependent especially on the viscosity of the prepolymer mass such that the meshs are completely impregnated by the prepolymer mass poured onto the meshs and that the threads of the net, texture, knitted fabric or a similar structure are completely coated by the mass forming on the side opposite to the surface of the mandrel a closed, smooth surface of prepolymer material, the thickness of which corresponds to the distance of the substrate from the surface of the mandrel, which polymer material can be separated from said mandrel surface.

By that positioning of the net, texture, knitted fabric or a similar structure within the pressband in relation to the running direction of the pressband, as well as by the fact that the threads those nets, textures, knitted fabrics or similar structures are consisting of are connected to one another but not interwoven with one another, the flexibility or elasticity of the pressband on operation is improved essentially so that a tension profile is formed which avoids the creation of tension peaks and which is in contrast to the tension profile of the common pressbands more uniform and more homogenous and in addition to that it is on a lower level. As a consequence the crossthreads and longitudinal threads of the substrate which are with respect to the direction of running of the pressband no more positioned in parallel or rectangularly but in general diagonally are not released even after a long running time from the coating mass, for instance polyurethane, surrounding them but remain in a fixed position within the coating mass so that formation of breakes within the pressbands are completely avoided even if there will be troubles because of waste material.

There are many advantageous embodiments of the subject invention which are dealt with in the subclaims. According to one advantageous embodiment the substrate is configured as a tube and is fixed in a tensioning device at both front sides of the mandrel and is axially tensioned by a stretching device, the construction being such that the substrate is held during the coating operation in the required distance from the surface of the mandrel by a distance annulus.

In accordance with an advantageous further improvement of the invention multifile threads are used for helically winding the threads onto the substrate during coating of the same by casting the prepolymer onto the surface of the substrate resulting in obtaining the required strength of the pressband in circumferential direction thereof.

According to a further advantageous feature of the subject invention the threads of which the substrate is provided, i.e. the net, texture, knitted fabric or similar structure, can be multifile threads of plastic material in order to obtain the required tensional stability of the pressband.

After the casting of the prepolymer material and its couring on the surface of the mandrel the obtained pressband can be advantageously mechanically treated to obtain the required thickness and/or quality of the surface before the pressband will be withdrawn from the surface of the mandrel. In this connection it has been found further advantageous to provide the surface of the pressband also with holes and/or depressions for the removal of liquid.

BRIEF DESCRIPTION OF THE DRAWINGS

The invention will be described below with reference to the embodiments thereof as illustrated in the drawings. In the drawings.

Figure 1:
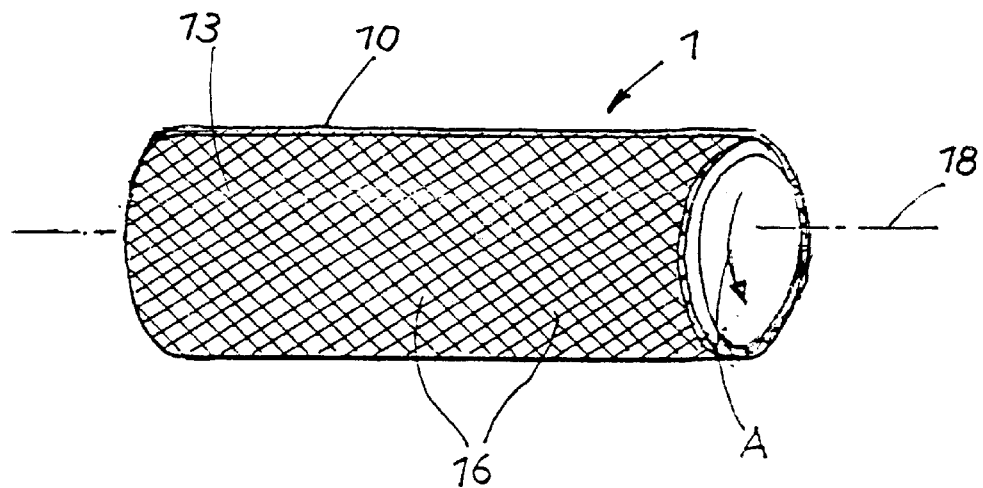
FIG. 1 is a schematic, perspective view onto a mandrel over which a substrate in form of a tube-like net consisting of threads is tensioned, which substrate is coated with a prepolymer on feeding threads thereto.
Figures 3, 4:
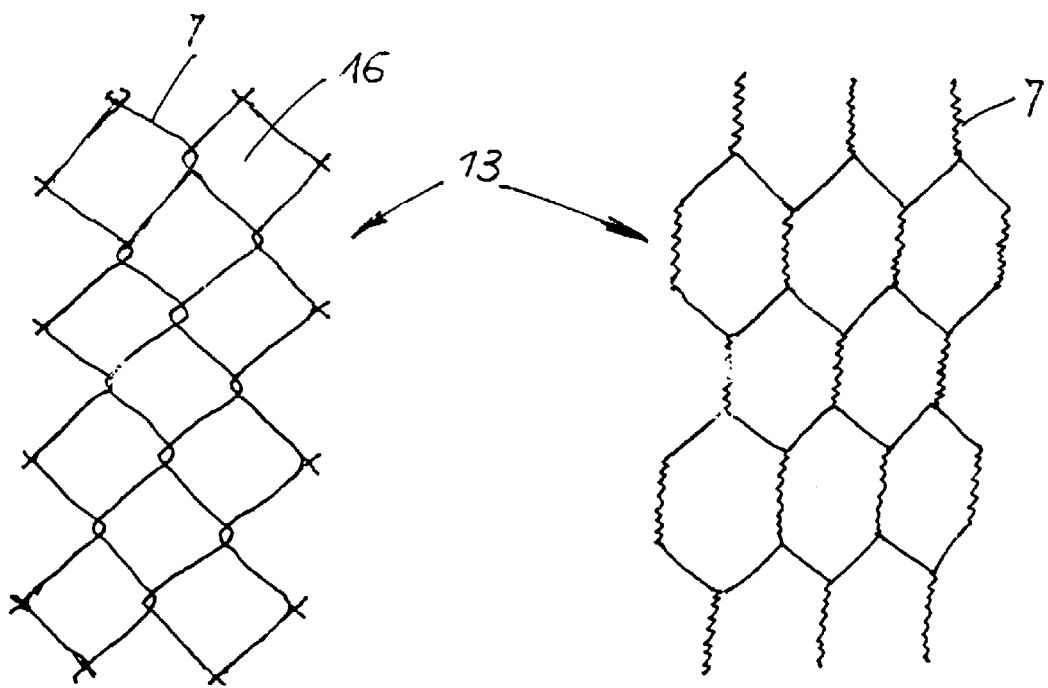
FIGS. 3 and 4 are schematical views onto net-like structures which can be used as substrate and which consist of monofile and/or multifile threads.
Figure 2:
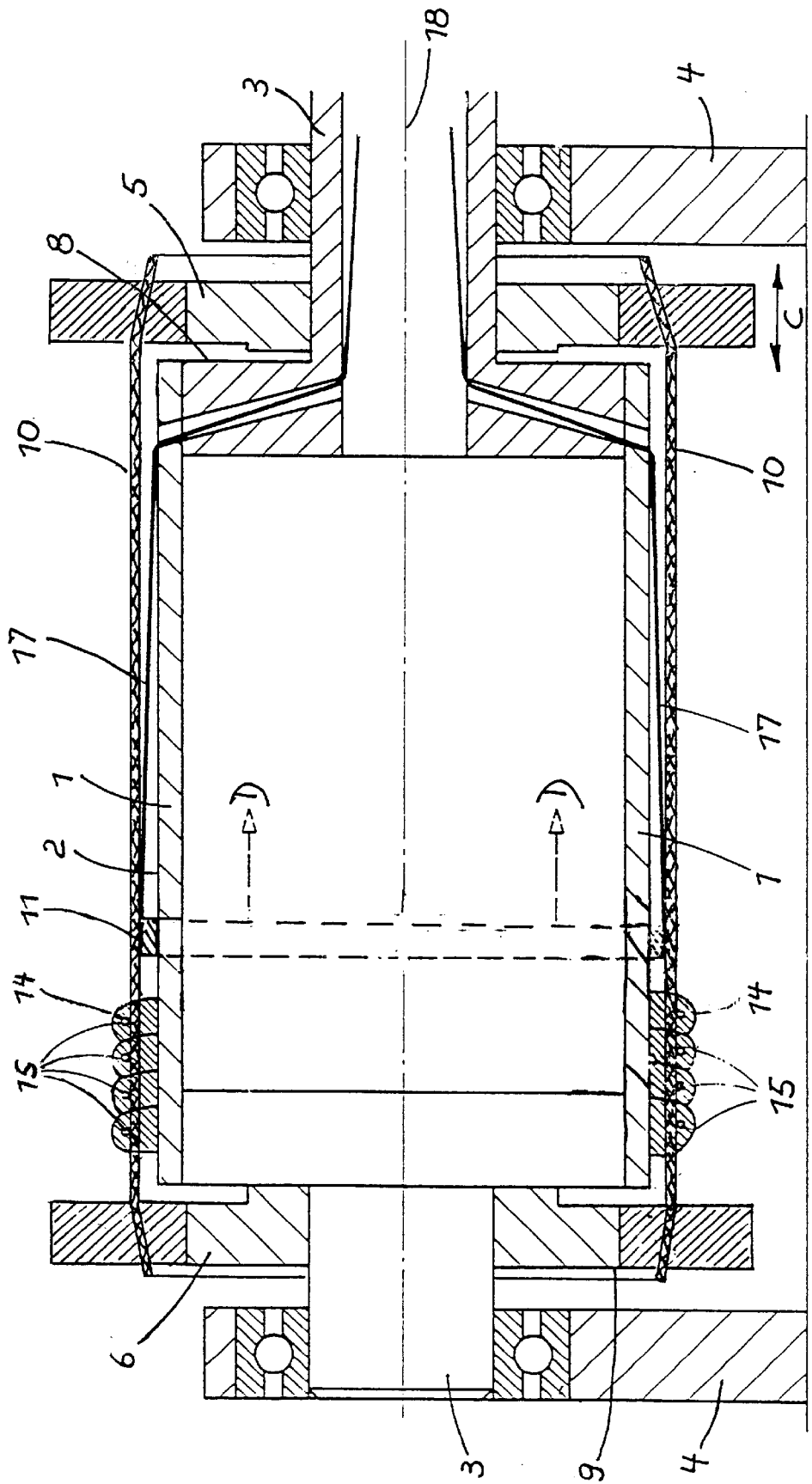
FIG. 2 is a schematic longitudinal sectional view of a mandrel device provided with front side tension annulus for the substrate which is to be coated and to be wound.

The mandrel 1 as shown in FIG. 1 in form of a cylindrical roll is used in connection with further elements of the device as shown in FIG. 2 for the manufacture of dimensionally stable, liquid-impermeable, flexible, elastic pressbands, particularly for use with broad-nip shoepresses of paper making machines. Such kind of pressbands which are at least provided on their outer side opposite to the fibrous web or the felt or felts, respectively, with cavities and/or depressions for liquid drainage, are manufactured as follows. A flowable mixture of a prepolymer is poured or cast onto a substrate 10 by means of a not shown jet as well as coating device. The substrate is maintained by means of a distance device in form of a distance annulus 11 as shown in FIG. 2 in a distance from the cylindrical surface 2 of the mandrel, which distance can be adjusted by that distance annulus. The substrate 10 is configured as a net 13 (as shown in FIGS. 3 and 4) or a not shown texture, web or knitted fabric or a similar configuration consisting of monofile or multifile threads 7 of plastic material Prior to that coating operation the substrate 10 is provided with monofile or multifile threads 15 which are layed down onto the substrate 10 in direction of rotation A of the mandrel 1 in a helically configurated manner. Thereafter, these threads 15 are coated with polymer 14. The substrate is spanned like a diaphragm over the surface of the mandrel 1 and its threads 7 extend transverse or diagonal to the longitudinal direction of the pressband.

Figure 5:
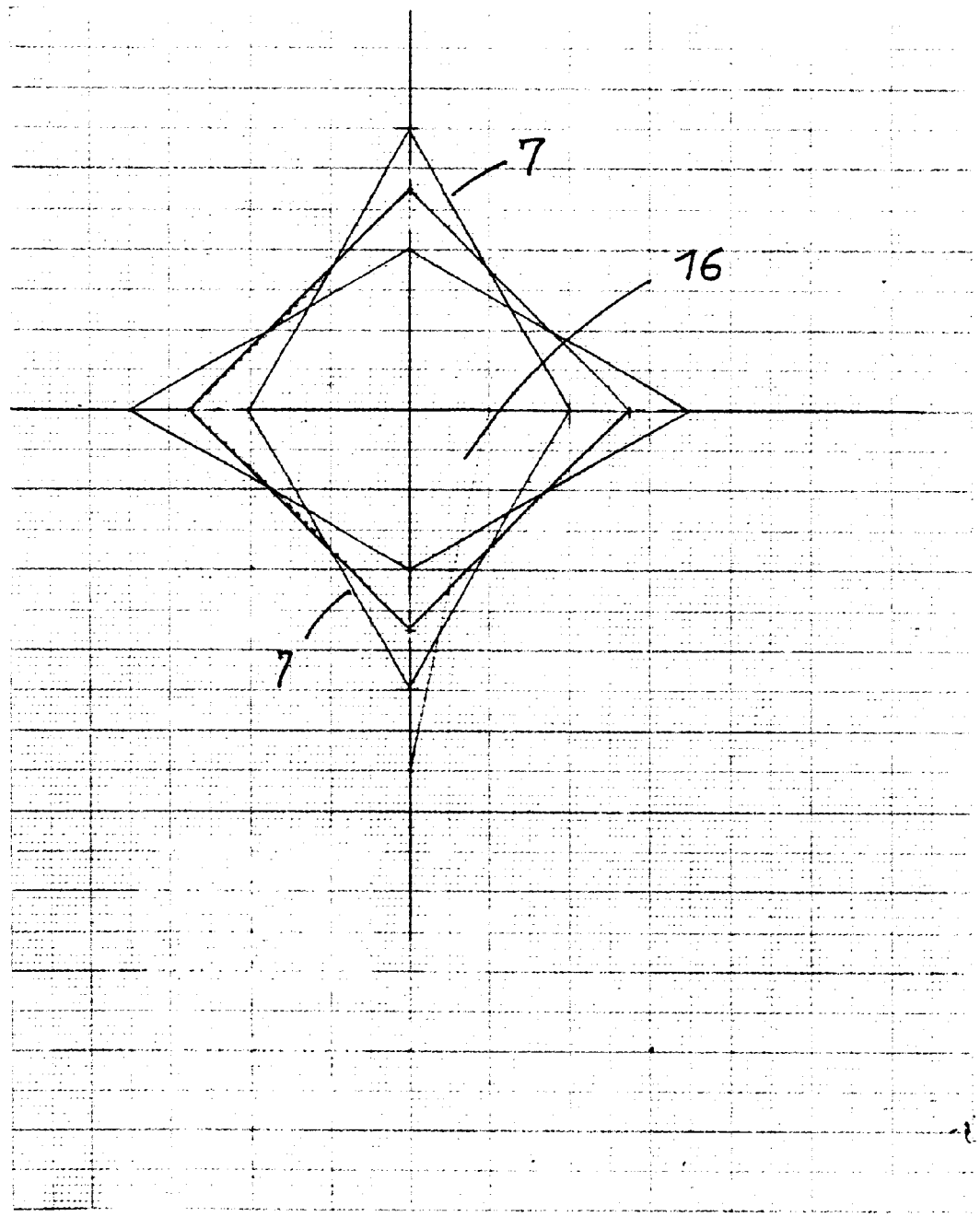
FIG. 5 is a schematic view onto the mesh of a net-like structure of the kind as shown in FIGS. 3 and 4 in different conditions of longitudinal and cross-tension appearing in the tube-like web, texture or knitted fabric elastically stretched over the surface of the mandrel.

Thus, net 13 consists of a multiplicity of meshes 16 provided by the threads 7 which meshs, however, are no woven meshs, i.e. they are not provided with warp threads and weft threads. The width of the mesh is exspecially chosen dependent on the viscosity of the prepolymer mass such that the meshs are completely impregnated by the prepolymer mass and the threads are completely coated by that mass. In this way on the surface 2 of the side of the mandrel opposite or adjacent to the substrate 10 a completely closed, smooth surface layer of prepolymer material is provided the thickness of that layer corresponds to the distance given by the distance annulus 11. The width of the mesh amounts advantageously to 4 to 6 mm. As material for the threads 7 of the substrate polyamid and polyester as well as Keflar® and Dyneema® have found to be essentially advantageous, the last one because of its high tensile strength. The required elastic stretching of the substrate is obtained by the kind of joining the threads 7 which is shown for instance in FIGS. 3 and 4 as well as in FIG. 5 at a mesh.

After the prepolymer material is cured on the surface of the mandrel the such manufactured pressband is brought to the required thickness by a mechanical treatment, for instance by means of a lathe-tool so that the required quality of the surface will be created. Thereafter, the pressband which can also be provided on its surface with blind bores, ridges or grooves in order to fulfill its future function of dewatering of fiber webs or felts, respectively of paper making machines, will be withdrawn from the mandrel by a drawing device.

As shown in FIG. 2, at both front faces 8, 9 of the mandrel a tension annulus 5, 6 is located on the mandrel 1 supporting shaft 3. These two tension annulus 5, 6 keep the tube-like substrate 10 under extended condition in a required distance from the surface 2 adjusted by the distance annulus 11. For that purpose the annulus 5 on the shaft 3 supported by the bearings 4 is axially movable as shown by the double arrow C, whereas the other tension annulus 6 is axially fixed on the shaft 3. The distance annulus 11 is drawn by a drawing device 17 in the direction of the arrow D so that this annulus moves forwardly in the same extent as the coating mass is axially proceeding which is laid down on the substrate by a not shown jet.

The threads 15 which are to be wound onto the substrate extent under an angle transverse to the longitudinal direction of the pressband and are thus also wound on the substrate in a spiral-like manner. These threads 15 can be of plastic material like the threads 7 forming the meshs 16 of the net 13, texture or knitted fabric multifile threads.

By this method of the manufacture of pressbands by means of a net, texture, knitted fabric or a comparable structure forming a substrate the threads of which extent transverse or diagonal, respectively to the running direction of the pressband and thus transfers to the longitudinal axes 18 of the mandrel, the tensile strength and stretching stability of the pressbands are essentially improved with respect to the common method according to which instead of such a substrate threads are embedded into the coating mass running parallel and in longitudinal direction of the pressband. Because of the spiral-like winding of the threads during the coating according to the subject invention the required stability of the pressband in circumferential direction is obtained. Therefore, the durability or lifetime of such kind of pressbands is extended essentially, because the generation of tension peaks during operation of the pressband is avoided. Thus, the tension profile in the cross-section of the pressband is more uniform and on a lower level. This is the reason why the threads of plastic material within the coating mass remain much longer in their original position as in known pressbands. Moreover, the pressband according to the subject invention is much less sensitive with respect to waste particles which can be drawn into the nip so that the pressband does not break in contrast to the known pressband.

What is claimed is:

1. A flexible pressband for use in an extended nip shoepress of a papermaking machine, comprising:

A) a tubular non-woven mesh substrate of connected threads, said tubular non-woven mesh substrate extendable in both a longitudinal direction and a running direction of the pressband;

B) a polymer mass encapsulating the tubular non-woven mesh substrate, covering an inner surface of the pressband disposed to run against a shoepress and also covering the outer surface thereof; and C) at least one thread helically wound about the outer surface of the tubular non-woven mesh substrate and also encapsulated in the polymer mass.

2. A flexible pressband as defined in claim 1 wherein the tubular non-woven mesh substrate comprises a plurality of layers.

3. A flexible pressband as defined in claim 1 wherein first portions of the threads of the non-woven mesh substrate extend diagonally to both the longitudinal direction and the running direction of the pressband.

4. A flexible pressband as defined in claim 3 wherein second, linked portions of the threads of the non-woven mesh substrate extend in the running direction of the pressband.

5. A flexible pressband as defined in claim 1 wherein the threads are monofilament.

6. A flexible pressband as defined in claim 1 wherein the threads are multi-filament.

7. A dimensionally stable, liquid impermeable pressband for use in an extended nip shoepress of a papermaking machine, the pressband comprising a tubular substrate, said substrate comprising a net, laced or knitted fabric made of threads which are interlaced but not woven into a mesh, such that the substrate is thereby extensible in the longitudinal and/or cross direction of the pressband, the substrate being completely impregnated with a polymer material, including a polymer layer formed on the surface of the pressband adjacent to the substrate and disposed to run against the shoepress, the pressband further comprising helically wound threads positioned on the side of the substrate opposite to said polymer layer, said helically wound threads being embedded in the polymer material.

8. A pressband according to claim 7, characterized in that the substrate consists of several superimposed layers of a net, texture, knitted fabric or similar structure the threads of which are forming meshes provided of non-interwoven threads.

9. A pressband according to claim 7, wherein the helically wound threads are monofilament threads.

10. A pressband as defined in claim 7, wherein the helically wound threads are multifilament threads.

* * * * *